US010014003B2

(12) United States Patent
Kim et al.

(10) Patent No.: US 10,014,003 B2
(45) Date of Patent: Jul. 3, 2018

(54) SOUND DETECTION METHOD FOR RECOGNIZING HAZARD SITUATION

(71) Applicant: GWANGJU INSTITUTE OF SCIENCE AND TECHNOLOGY, Gwangju (KR)

(72) Inventors: Hong-Kook Kim, Gwangju (KR); Dong Yun Lee, Gwangju (KR); Kwang Myung Jeon, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 15/041,487

(22) Filed: Feb. 11, 2016

(65) Prior Publication Data

US 2017/0103776 A1 Apr. 13, 2017

Related U.S. Application Data

(60) Provisional application No. 62/239,989, filed on Oct. 12, 2015.

(51) Int. Cl.
*G10L 15/00* (2013.01)
*G10L 25/51* (2013.01)
(Continued)

(52) U.S. Cl.
CPC .............. *G10L 25/51* (2013.01); *G08B 19/00* (2013.01); *G10L 21/0272* (2013.01); *G10L 25/24* (2013.01); *G10L 25/27* (2013.01)

(58) Field of Classification Search
USPC .......................... 704/208, 214, 233, 239, 240
See application file for complete search history.

(56) References Cited

U.S. PATENT DOCUMENTS

2010/0254539 A1 10/2010 Jeong et al.
2013/0124200 A1* 5/2013 Mysore .................. G10L 15/20 704/211

(Continued)

FOREIGN PATENT DOCUMENTS

JP 2011-017818 A 1/2011
KR 10-2010-0042482 A 4/2010

(Continued)

OTHER PUBLICATIONS

Office Action dated Jun. 12, 2017 in Korean Application No. 10-2015-0082605.

*Primary Examiner* — Leonard Saint Cyr
(74) *Attorney, Agent, or Firm* — Saliwanchik, Lloyd & Eisenschenk

(57) ABSTRACT

A method of detecting a particular abnormal sound in an environment with background noise is provided. The method includes acquiring a sound from a microphone, separating abnormal sounds from the input sound based on non-negative matrix factorization (NMF), extracting Mel-frequency cepstral coefficient (MFCC) parameters according to the separated abnormal sounds, calculating hidden Markov model (HMM) likelihoods according to the separated abnormal sounds, and comparing the likelihoods of the separated abnormal sounds with a reference value to determine whether or not an abnormal sound has occurred. According to the method, based on NMF, a sound to be detected is compared with ambient noise in a one-to-one basis and classified so that the sound may be stably detected even in an actual environment with multiple noises.

8 Claims, 3 Drawing Sheets

(51) Int. Cl.

| | |
|---|---|
| ***G10L 25/24*** | (2013.01) |
| ***G08B 19/00*** | (2006.01) |
| ***G10L 21/0272*** | (2013.01) |
| ***G10L 25/27*** | (2013.01) |

(56) References Cited

U.S. PATENT DOCUMENTS

2014/0226838 A1* 8/2014 Wingate .............. G10L 21/0272
381/111
2015/0269933 A1* 9/2015 Yu ........................... G10L 15/16
704/232

FOREIGN PATENT DOCUMENTS

KR 10-2010-0111499 A 10/2010
KR 10-2011-0012946 A 2/2011
KR 10-1023211 B1 3/2011
KR 10-2011-0120788 A 11/2011
KR 10-2012-0021428 A 3/2012

* cited by examiner

[Fig 1]
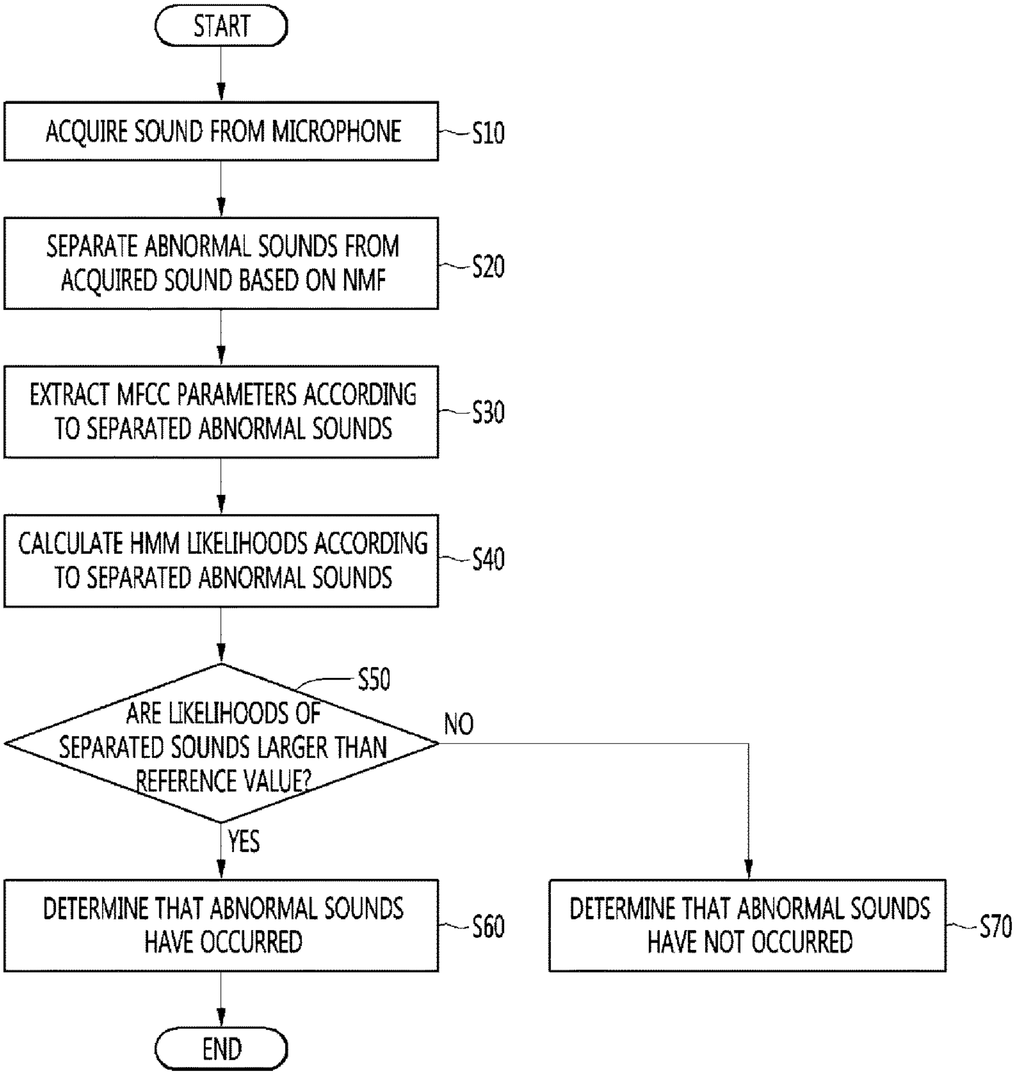

[Fig 2]
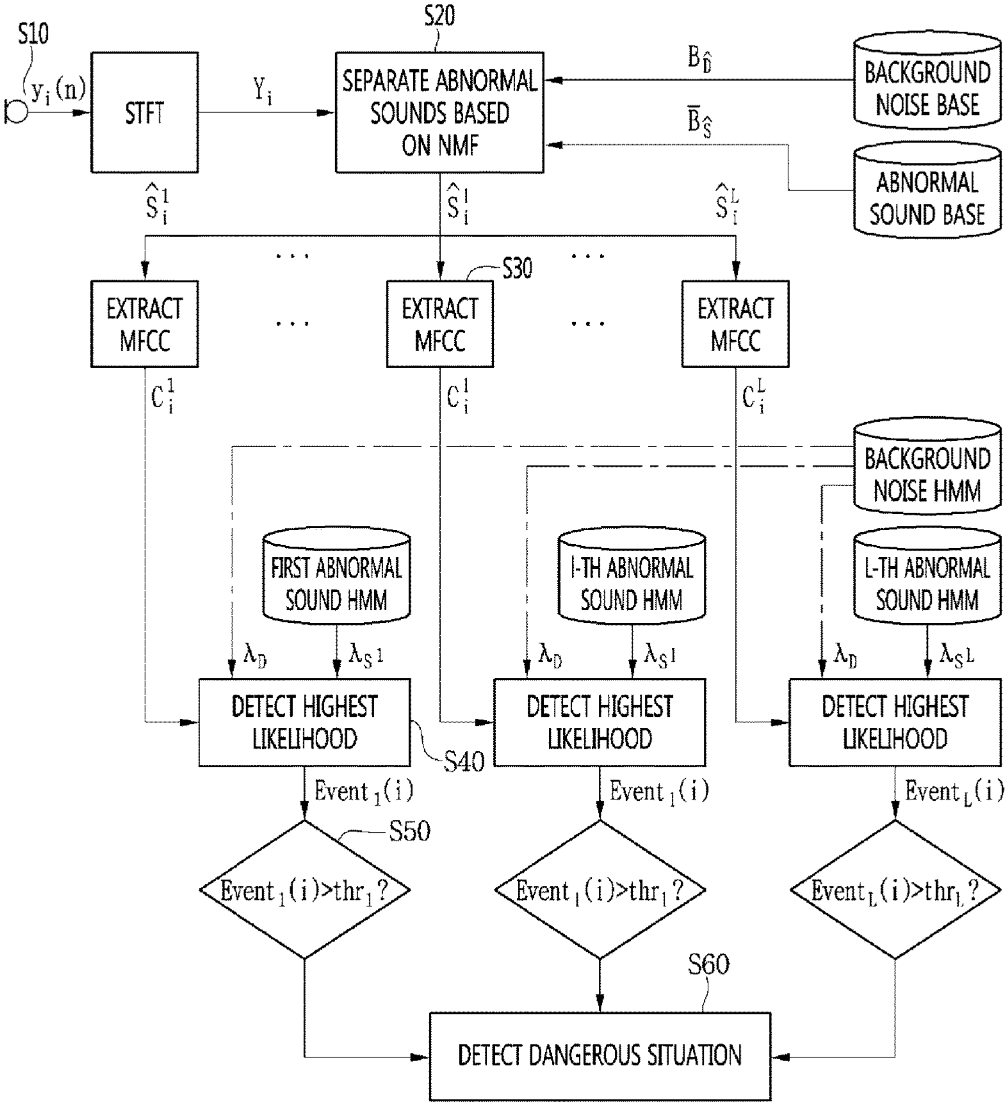

[Fig 3]
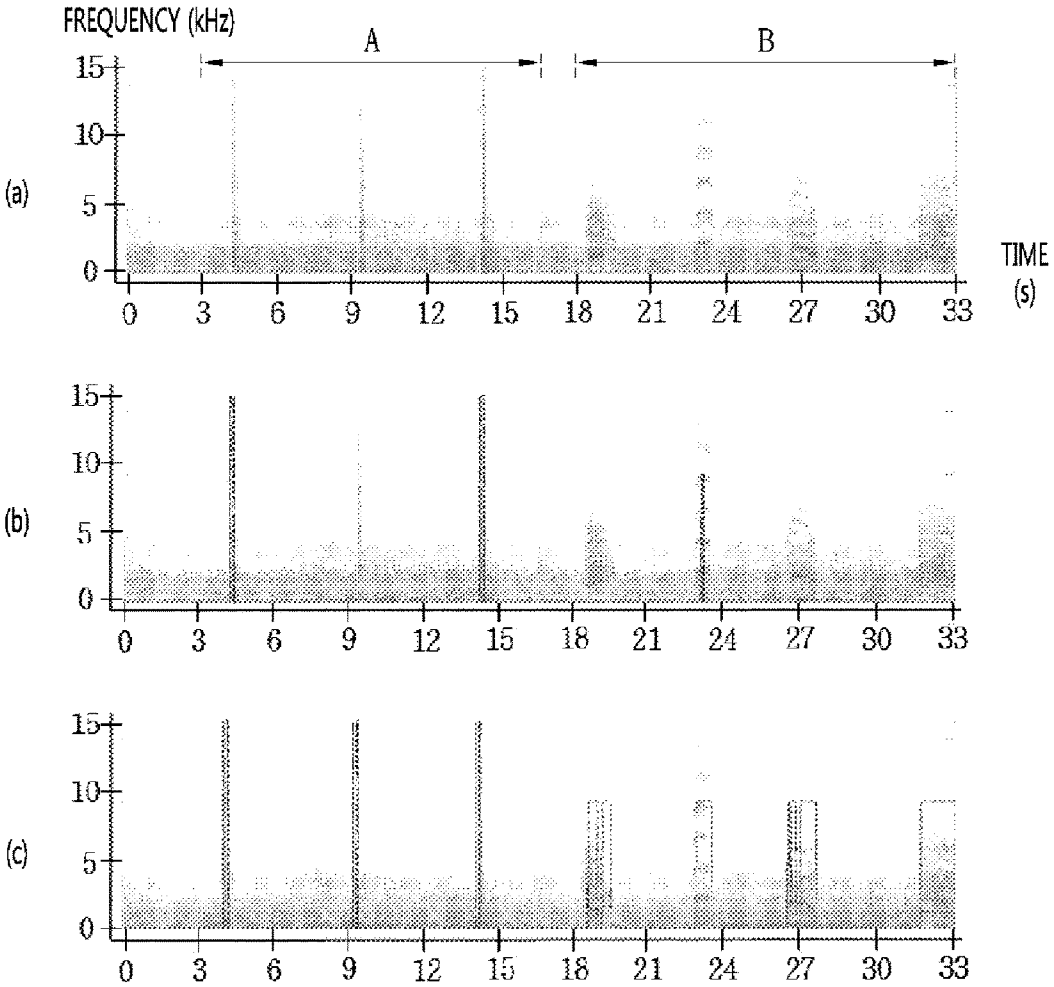

SOUND DETECTION METHOD FOR RECOGNIZING HAZARD SITUATION

CROSS-REFERENCE TO RELATED APPLICATION

The application claims the benefit of U.S. Provisional Application Ser. No. 62/239,989, filed Oct. 12, 2015, which is hereby incorporated by reference in its entirety.

BACKGROUND

1. Field

The present disclosure relates to a sound monitoring method, and more particularly, to a sound detection method of classifying various kinds of mixed sounds in an actual environment, determining whether or not a user is exposed to a dangerous situation, and recognizing a hazard situation.

2. Background

Generally, closed circuit television (CCTV) refers to a system which transfers video information to a particular user for a particular purpose, and is configured so that an arbitrary person other than the particular user cannot connect to the system in a wired or wireless manner and receive a video. CCTVs are mainly used in various surveillance systems for places congested with people, such as large discount stores, banks, apartments, schools, hotels, public offices, subway stations, etc., or places that require constant monitoring, such as unmanned base stations, unmanned substations, police stations, etc., and play a major role in acquiring clues from various crime scenes.

The market scale of CCTV cameras and Internet protocol (IP) cameras which are used as security cameras have drastically grown since 2010, and the Korean market of security cameras also grew to about 420 billion Korean won in 2013. In light of this, it can be seen that a security system for preventing various crimes is attracting attention these days.

However, in spite of the rapid proliferation of security cameras such as CCTVs, blind spots of security cameras still remain, and a crime rate is not being reduced. When one camera is used to monitor several directions, even if a guard continuously changes the position of the camera, it may be impossible to continuously monitor the surveillance area due to carelessness of the guard or a lack of guards, and a surveillance system may not fully achieve its role.

Also, when a plurality of security cameras are installed to minimize blind spots, the number of screens to be monitored increases, and a larger number of security workers are required to monitor the screens. Although blind spots are reduced and a probability that a crime scene will be recorded increases, a probability that the crime will be handled in real time is reduced and the cost of equipment increases. Therefore, this is not an efficient method for crime prevention.

Consequently, to rapidly cope with a dangerous situation such as with crime, it is necessary to rapidly determine whether or not a dangerous situation has actually occurred for a user by detecting and classifying not only video images shown through a surveillance camera but also acoustic events included in the video images.

To classify a sound according to related art, a system is utilized for identifying three types of sounds, such as explosions, gunshots, screams, etc., through two operations of detecting a particular event sound, such as a gunshot or a scream, using a Gaussian mixture model (GMM) classifier and identifying sounds of events using a hidden Markov model (HMM) classifier based on Mel-frequency cepstral coefficient (MFCC) features. However, the aforementioned methods have problems in that the accuracy of sound detection is not ensured at a low signal-to-noise ratio (SNR), and it is difficult for the HMM classifier to distinguish between ambient noise and event sounds.

BRIEF SUMMARY

The present disclosure is directed to providing a sound detection method of detecting sounds coming from the surroundings and identifying a sound of a dangerous situation, such as a crime, to rapidly recognize the occurrence of a crime.

The present disclosure is directed to implementing a system capable of detecting a sound, determining whether or not a particular situation has occurred in real time, and rapidly handling the situation.

According to an aspect of the present disclosure, there is provided a method of detecting a sound for recognizing a hazard situation in an environment with mixed background noise, the method including acquiring a sound signal from a microphone; separating abnormal sounds from the input sound signal based on non-negative matrix factorization (NMF); extracting Mel-frequency cepstral coefficient (MFCC) parameters according to the separated abnormal sounds; calculating hidden Markov model (HMM) likelihoods according to the separated abnormal sounds; and comparing the HMM likelihoods of the separated abnormal sounds with a reference value to determine whether or not an abnormal sound has occurred.

The separating of the abnormal sounds based on NMF may include decomposing the input sound into a linear combination of several vectors using a background noise base and a plurality of abnormal sound bases and determining degrees of similarity with a pre-trained abnormal sound signal. The background noise base and the plurality of abnormal sound bases may be obtained through NMF training in an offline environment using corresponding signals.

The extracting of the MFCC parameters according to the separated abnormal sounds may include converting the separated abnormal sounds into 39-dimensional feature vectors, and the feature vectors may consist of the MFCC parameters including logarithmic energy and delta acceleration factors.

The method may further include, after the extracting of the MFCC parameters according to the separated abnormal sounds, detecting a highest likelihood of each separated abnormal sound using an HMM of the background noise and an HMM of the separated abnormal sound.

A likelihood of the HMM of the background noise may be calculated as a probability that feature values of the abnormal sound will be detected in the HMM of the background noise, and a likelihood of the HMM of the abnormal sound may be calculated as a probability that feature values of the abnormal sound will be detected in the HMM of the abnormal sound.

39-dimensional feature vectors may be obtained by training the HMM of the abnormal sound and the HMM of the background noise, and an expectation-maximization (EM) algorithm may be used in training of an HMM parameter.

The method may further include calculating an HMM likelihood of the abnormal sound and an HMM likelihood of the background noise, and determining whether the abnormal sound exists in a particular frame through an HMM likelihood ratio of the background noise to the abnormal sound.

The method may further include comparing the HMM likelihood ratio of the background noise to the abnormal sound with a preset reference value, and determining that the sound signal includes the abnormal sound when the likelihood ratio is larger than the preset reference value.

The method may further include setting a probability that each frame will include the abnormal sound to 1 when the likelihood ratio is larger than the preset reference value, setting the probability to 0 otherwise, and determining that the abnormal sound is included in the sound signal to recognize a dangerous situation when a sum of set probabilities is larger than 0.

BRIEF DESCRIPTION OF THE DRAWINGS

Embodiments will be described in detail with reference to the following drawings in which like reference numerals refer to like elements, and wherein:

FIG. 1 is a flowchart of a method of detecting a sound according to an embodiment of the present disclosure;

FIG. 2 is a diagram showing a system for detecting a sound according to the embodiment; and FIG. 3 shows graphs for comparing the performance of sound detection according to the embodiment of the present disclosure with the performance of sound detection according to related art.

DETAILED DESCRIPTION

Hereinafter, embodiments will be described in detail with reference to the accompanying drawings. The embodiments may, however, be embodied in many different forms and should not be construed as being limited to the embodiments set forth herein; rather, alternate embodiments falling within the spirit and scope can be seen as included in the present disclosure.

The present disclosure proposes a method of simultaneously performing sound source separation and acoustic event detection to improve the accuracy in detecting a surrounding acoustic event at a low signal-to-noise (SNR). According to an embodiment of the present disclosure, event sounds are separated from ambient noise through non-negative matrix factorization (NMF), and a probability-based test is performed for each separated sound using a hidden Markov model (HMM) to determine whether an acoustic event has occurred.

FIG. 1 is a flowchart sequentially illustrating a method of detecting a sound according to an embodiment. Referring to FIG. 1, the embodiment of the present disclosure is a method of detecting a particular sound targeted by a user, and the sound may be detected through the following process.

The embodiment may include an operation of acquiring a sound from a microphone (S10), an operation of separating abnormal sounds from the input sound acquired in operation S10 based on NMF (S20), an operation of extracting Mel-frequency cepstral coefficient (MFCC) parameters according to the abnormal sounds separated in operation S20 (S30), an operation of calculating likelihoods based on HMMs according to the abnormal sounds separated in operation S20 (S40), an operation of comparing the likelihoods of the separated abnormal sounds calculated in operation S40 with a reference value (S50), an operation of determining that an abnormal sound has occurred when a likelihood of a separated abnormal sound is equal to or larger than the reference value (S60), and an operation of determining that no abnormal sound has occurred when a likelihood of a separated abnormal sound is smaller than the reference value (S70).

FIG. 2 is an operational diagram of the method of detecting a sound according to the embodiment, showing the method disclosed in FIG. 1 in further detail. Referring to FIGS. 1 and 2 together, in the operation of acquiring a sound from a microphone (S10), a process of converting an input sound signal into a time-frequency domain may be performed. First, $y_i(n)$ which is an input sound signal of an i-th frame is converted into $|Y_i(k)|$ which is an amplitude signal of a spectrum through short-term Fourier transform (STFT).

It is assumed that the input sound signal $y_i(n)$ is a signal $s_i^l$ in which L abnormal sounds are mixed and a background noise signal is $d_i(n)$. The input sound signal is a signal in which the background noise signal and the L abnormal sounds are mixed, and may be expressed as $y_i(n)=d_i(n)+\Sigma_{l=1}^{L}s_i^l(n)$.

Subsequently, the operation of separating abnormal sounds from the input sound signal based on an NMF algorithm (S20) is performed. The NMF algorithm performs a process of generating a predictive frame of a current frame using a predictive algorithm for a previous frame of a previously input sound signal.

The input sound signal converted to have an amplitude of $|Y_i(k)|$ may be split into signals having a spectrum size corresponding to the L abnormal sounds using an NMF technique, and the signals may be expressed as $|S_i^l(k)|$ ($l=1, \ldots,$ and L).

The NMF technique is a technique of decomposing and expressing one matrix in the form of a product of two matrices. Generally, there are several techniques of decomposing a matrix, and various factorization techniques have been researched under different constraint conditions. The NMF technique differs from other techniques in that factorization is performed so that all elements of the decomposed two matrices satisfy a non-negative condition. In other words, when one matrix is decomposed and expressed as a product of two matrices, the decomposition is performed according to the NMF technique so that each element of the two matrices has a value of 0 or a positive value larger than 0.

To decompose one matrix into a product of two matrices is to express one vector as a linear combination of several vectors. In terms of signal space, this is to construct a subspace based on the several vectors of the linear combination and project one of the vectors to the subspace. In this projection process, there is an inevitable projection error, which serves as an index for defining a distance between the vector and the subspace. Therefore, when an input signal is expressed as a linear combination of basis vectors, that is, the input signal is projected in one subspace, it is possible to determine degrees of similarity between the input signal and the particular basis vectors from a size of the projection error.

An operation of separating an acoustic event from ambient noise using the above-described NMF technique will be described below.

A spectrum amplitude of frames having M consecutive input sound signals is converted into a K×M dimensional time-frequency matrix, and may be expressed as follows: $Y_i=[|Y_{i-M+1}(k)|\sim|Y_{i-M}(k)|\sim|Y_i(k)|]$.

Therefore, assuming that the input sound signal is the sum of a background noise signal $D_i$ and a plurality of abnormal sound signals $S_i^l$ and is expressed as an equation $Y_i \cong D_i+\Sigma_{l=1}^{L}S_i^l$, $D_i$ and $S_i^l$ are time-frequency matrices of $d_i(n)$ and $s_i^l(n)$.

Subsequently, NMF classification may be performed using a background noise base $B_{\hat{D}}$ and a plurality (L) of abnormal sound bases $B_{\hat{S}}^l$ ($l$=1 to L). In this embodiment, the background noise base $B_{\hat{D}}$ and the abnormal sound bases $B_{\hat{S}}^l$ may be obtained through offline NMF training with corresponding signals. In other words, a spectrum amplitude of background noise in the i-th frame and a spectrum amplitude of an l-th abnormal sound in the i-th frame may be calculated using the relationship between $\hat{D}_i = B_{\hat{D}} a_{\hat{D}_i}$ and $\hat{S}_i^l = B_{\hat{S}} a_{\hat{S}_i}$. Here, $a_{\hat{D}_i}$ and $a_{\hat{S}_i}^l$ which are active matrices may be consecutively obtained by Equation 1 below.

$$\begin{bmatrix} \overline{a}_{\hat{S}_i}^h \\ a_{\hat{D}_i}^h \end{bmatrix} = \begin{bmatrix} \overline{a}_{\hat{S}_i}^{h-1} \\ a_{\hat{D}_i}^{h-1} \end{bmatrix} \otimes \frac{[\overline{B}_{\hat{S}} B_{\hat{D}}]^T \dfrac{Y_i}{[\overline{B}_{\hat{S}} B_{\hat{D}}]\left[(\overline{a}_{\hat{S}_i}^{h-1})^T (\overline{a}_{\hat{D}_i}^{h-1})^T\right]^T}}{[\overline{B}_{\hat{S}} B_{\hat{D}}]^T 1} \quad \text{[Equation 1]}$$

(Here, h is an iteration coefficient, and multiplication and division may be performed between base-specific factors.) Equation 1 is derived from a condition that a Kullback-Leibler divergence is minimized, and the Kullback-Leibler divergence may be expressed as Equation 2 below.

$$Div\left(Y_i; \left[a_{\hat{S}_i}^{h-1} a_{\hat{D}_i}^{h-1}\right]^T, [B_{\hat{S}} B_{\hat{D}}]\right) = \sum_{K,N} \left| (Y_i \otimes \log\left(\frac{Y_i}{[B_{\hat{S}} B_{\hat{D}}]\left[a_{\hat{S}_i}^{h-1} a_{\hat{D}_i}^{h-1}\right]^T}\right) - \left(Y_i - [B_{\hat{S}} B_{\hat{D}}]\left[a_{\hat{S}_i}^{h-1} a_{\hat{D}_i}^{h-1}\right]^T\right) \right| \quad \text{[Equation 2]}$$

Equation 1 is repeated until a solution of Equation 2 does not become smaller than a predetermined value. A condition for repeating Equation 1 is given by Equation 3 below.

$$\frac{\left| Div\left(Y_i; \left[a_{\hat{S}_i}^{h-1} a_{\hat{D}_i}^{h-1}\right]^T, [B_{\hat{S}} B_{\hat{D}}]\right) - Div\left(Y_i; \left[a_{\hat{S}_i}^{h} a_{\hat{D}_i}^{h}\right]^T, [B_{\hat{S}} B_{\hat{D}}]\right) \right|}{Div\left(Y_i; \left[a_{\hat{S}_i}^{h} a_{\hat{D}_i}^{h}\right]^T, [B_{\hat{S}} B_{\hat{D}}]\right)} < \theta \quad \text{[Equation 3]}$$

In Equation 3, θ may be set as a very small threshold value of about 0.0001.

$\overline{B}_{\hat{S}} = [B_{\hat{S}}^1 L\, B_{\hat{S}}^l L\, B_{\hat{S}}^L]$, $\overline{a}_{\hat{S}_i} = [(a_{\hat{S}_i}^1)^T L\, (a_{\hat{S}_i}^l)^T L\, (a_{\hat{S}_i}^L)^T]^T$, and 1 which are abnormal sound bases including L events and expressed as one matrix may be K×M matrices having identical elements. When a relative reduction value of the Kullback-Leibler divergence is smaller than a preset threshold value as shown in Equation 3, the repetition process may be finished.

Here, r and R are base rankings of the abnormal sound base $B_{\hat{S}}^l$ and the background noise base $B_{\hat{D}}$ respectively, dimensions of $\overline{B}_{\hat{S}}$, $B_{\hat{D}}$, $\overline{a}_{\hat{S}_i}^h$, and $a_{\hat{D}_i}^h$ are represented as K*Lr, K*R, Lr*M, and R*M. Also, all elements of $\overline{a}_{\hat{S}_i}^0$ and $a_{\hat{D}_i}^0$ may be arbitrarily determined between 0 and 1.

After $\hat{S}_i^l = B_{\hat{S}}^l (a_{\hat{S}_i}^l)^{h*}$ which is the spectrum amplitude of the l-th abnormal sound in the i-th frame is calculated (when h* is the last iteration coefficient), the operation of extracting MFCC parameters according to the separated abnormal sounds (S30) may be performed.

In operation S30, $|\hat{S}_{i-m}^l(k)|$ is converted into 39-dimensional feature vectors $C_{i-m}^l$, which consist of 12 MFCCs including a logarithmic energy and delta acceleration factors thereof. As a result, $C_{i-m}^l$ which is M consecutive feature vectors may be expressed by an equation $C_i^l = [c^l_{i-M+1})^T \sim c^l_{i-M})^T \sim c^l_i)^T]^T$.

Subsequently, the operation of calculating HMM likelihoods according to the separated abnormal sounds (S40) is performed. In operation S40, the highest likelihood is detected through likelihoods of the l-th abnormal sound and background noise, and may be calculated using the HMM of the l-th abnormal sound and a signal $C_i^l$ from which an MFCC has been extracted.

In this embodiment, training of HMMs is performed in eight stages, and 16 mixed Gaussian probability density functions (pdfs) are modeled. To train $\Delta_{S^l} = \{\pi^{S^l}, A^{S^l}, B^{S^l}\}$ which is an HMM of the l-th abnormal sound, abnormal sound sources, such as an audio list of two minutes, etc., are prepared. On the other hand, to train $\Delta_D = \{\pi^D, A^D, B^D\}$ which represents an HMM of background noise, ambient noise recorded at an arbitrary place for five minutes is used.

In the HMM training, 39 decomposed feature vectors are obtained as feature parameters from the training audio list, and an expectation-maximization (EM) algorithm may be additionally used to train HMM parameters.

Subsequently, the operation of comparing the likelihoods of the separated abnormal sounds with a reference value (S50) may be performed.

After training the l-th abnormal sound HMM $\lambda_{S^l}$ and a background noise HMM $\lambda_D$, the l-th abnormal sound may be detected as follows. First, the likelihood of the abnormal sound HMM $\lambda_{S^l}$ and the background noise HMM $\lambda_D$ may be calculated by Equation 4 below using feature values $C_i^l$ of the l-th abnormal sound calculated in operation S30.

$$L_i^{S^l} = P(C_i^l | \lambda_{S^l}) \text{ and } L_i^D = P(C_i^l | \lambda_D) \quad \text{[Equation 4]}$$

As shown in Equation 4, the likelihood of the background noise HMM may be calculated as a probability that feature values of an abnormal sound will be detected in the background noise HMM, and the likelihood of the abnormal sound HMM may be calculated as a probability that feature values of an abnormal sound will be detected in the abnormal sound HMM.

Next, the operation of comparing the likelihoods using a likelihood $L_i^S$ of the abnormal sound HMM $\lambda_{S^l}$ and a likelihood $L_i^D$ of the background noise HMM $\lambda_D$ (S50) is performed. It is determined whether the l-th abnormal sound exists in the i-th frame, and the determination may be expressed by Equation 5.

$$\text{Event}_1(i) = \begin{cases} 1, & \text{if } L_i^D / L_i^{S1} > thr_1 \\ 0, & \text{Otherwise} \end{cases} \quad \text{[Equation 5]}$$

Here, when a reference value $thr_l$ is a preset threshold value and a ratio of the likelihood $L_i^D$ of the background noise HMM to the likelihood $L_i^{S^l}$ of the abnormal sound HMM is larger than the reference value, a detected likelihood value $\{\text{Event}_l(i)\}$ is 1 as shown in Equation 5 above.

The detected likelihood value $\{\text{Event}_l(i)\}$ of 1 indicates that the i-th frame includes the l-th abnormal sound. When it is determined that the i-th frame includes the abnormal sound through the comparison between the likelihood and the reference value as described above, it is possible to detect that the abnormal sound exists in an input signal corresponding to the current frame and a dangerous situation has occurred.

Therefore, according to the embodiment of the present disclosure, when at least one abnormal sound occurs, it is determined whether the at least one abnormal sound has occurred in the i-th frame to determine whether a dangerous situation has occurred. This may correspond to a case of $\Sigma_{i=1}^{l}\text{Event}_l(i)>0$. In other words, when the sum of detected likelihood values is larger than 0, it is possible to recognize a dangerous situation by determining that an abnormal sound is included in an input sound signal.

FIG. 3 shows graphs for comparing the performance of sound detection according to the embodiment of the present disclosure with the performance of sound detection according to related art. To test the sound detection performance of the embodiment, a comparison with an existing method using an HMM was made in terms of the accuracy of acoustic event detection using an F-measure.

To compare the embodiment with the related art, two or more abnormal sounds including a scream and a gunshot were taken into consideration. Since the two or more abnormal sounds (L=2) were used, it was possible to acquire two abnormal sound bases $B_{\bar{S}}^{l}$ and abnormal sound HMMs $\lambda_{S^l}$ using audio clips of a scream and a gunshot. Also, it was possible to acquire a background noise base $B_{\bar{D}}$ and a background noise HMM through audio clips recorded on public streets.

For the test, the scream and the gunshot were mixed with audio clips recorded on congested public streets. At this time, an average SNR varied from −5 dB to 15 dB at intervals of 5 dB according to a change of the average power of an abnormal sound. A scream region A and a gunshot region B did not overlap, and each SNR consisted of 10 screams and gunshots.

Table 1 shows false alarm ratios and missed-detection ratios for a comparison between the embodiment and the existing method.

TABLE 1

| | Existing Method | | | Embodiment | | |
|---|---|---|---|---|---|---|
| SNR (dB) | False Alarm | Missed-Detection | F-Measure | False Alarm | Missed-Detection | F-Measure |
| 15 | 4.55 | 0 | 97.62 | 0 | 0 | 100 |
| 10 | 3.57 | 20 | 86.96 | 2.38 | 2.5 | 97.5 |
| 5 | 0 | 54 | 46.38 | 2.38 | 10 | 93.23 |
| 0 | 0 | 87.5 | 22.14 | 13.92 | 17.5 | 83.73 |
| −5 | 0 | 100 | 0 | 2.78 | 32.5 | 78.07 |
| Average | 1.62 | 52.3 | 50.62 | 4.29 | 12.5 | 90.51 |

Referring to Table 1, it is possible to see that an average F-measure of the method of detecting a sound according to the embodiment is 90.51% and was remarkably increased compared to the existing method using an HMM. Compared to the existing method, F-measure values were remarkably increased in a section showing a low SNR of −5 dB to 5 dB, and thus the accuracy of abnormal sound detection was improved.

(a) of FIG. 3 is a graph illustrating the spectrum of a part of a test sound at an SNR of 5 dB. Here, it is assumed that the audio clip includes abnormal events, such as a scream and a gunshot, and ambient noise.

(b) of FIG. 3 is a graph illustrating the performance of the existing method of detecting an abnormal sound using an HMM, and (c) illustrates the performance of the method of detecting an abnormal sound according to the embodiment. Boxes outlined with dots in (b) and (c) denote abnormal events. Referring to (b) and (c), while only signals having relatively high frequencies are detected in the scream region according to the existing method, all signals are detected in the scream region according to the embodiment.

In other words, the embodiment shows that all abnormal sounds existing in the test sound are detected, but the existing method (CONV-HMM) of detecting a sound shows that all the abnormal sounds are not detected.

According to the embodiment, an abnormal sound is determined in a situation with background noise, and an NMF-based sound separation is performed. Also, a method of detecting an abnormal sound by comparing ratios of the likelihood of a noise HMM to the likelihoods of several abnormal sound HMMs with a reference value is used, so that the accuracy of sound detection may be improved even in an environment with a low SNR. Therefore, it is possible to determine whether or not a dangerous situation has occurred with high reliability.

According to the embodiment of the present disclosure, since a sound monitoring system compares sounds to detect with ambient noise in a one-to-one basis and classifies the sounds, it is possible to stably detect the sounds even in an actual environment with multiple noises.

According to the embodiment of the present disclosure, since voice data is recognized through an HMM based on the NMF technique, it is possible to detect a particular sound targeted by a user in an input signal with high accuracy and reliability.

According to the embodiment of the present disclosure, it is possible to improve the reliability of detecting a particular sound in an actual environment with a plurality of noises, and the embodiment of the present disclosure may be applied to various sound monitoring systems for rapidly detecting a dangerous situation. Consequently, high industrial applicability can be expected.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to apply such a feature, structure, or characteristic in connection with other ones of the embodiments.

Although embodiments have been described with reference to a number of illustrative embodiments thereof, it should be understood that numerous other modifications and embodiments can be devised by those skilled in the art that fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method implemented on an audio signal monitoring system for detecting a particular abnormal sound in an environment with mixed background noise, the method comprising:

acquiring a sound signal via a microphone;

converting, by a converter, the acquired sound signal into time-frequency domain signals;

separating abnormal sounds from the converted sound signals;

extracting Mel-frequency cepstral coefficient (MFCC) parameters according to the separated abnormal sounds;

calculating hidden Markov model (HMM) likelihoods according to the separated abnormal sounds; and comparing the HMM likelihoods of the separated abnormal sounds with a reference value to determine whether or not an abnormal sound has occurred;

wherein the separating abnormal sounds comprises decomposing the converted sound signals into a linear combination of several vectors through a background noise base and a plurality of abnormal sound bases and determining degrees of similarity to a pre-trained abnormal sound signal, wherein calculating hidden Markov model (HMM) likelihoods according to the separated abnormal sounds comprises:

detecting a highest likelihood of each separated abnormal sound by an HMM of the background noise and an HMM of the separated abnormal sound after the extracting of the MFCC parameters according to the separated abnormal sounds through non-negative matrix factorization (NMF), wherein the background noise base and the abnormal sound bases are trained and saved before detecting the particular abnormal sound, and wherein a verification based on the HMM likelihoods is performed only for the separated abnormal sounds through the separating of the abnormal sounds based on the NMF.

2. The method according to claim 1, wherein the background noise base and the plurality of abnormal sound bases are obtained through non-negative matrix factorization (NMF) training in an offline environment with corresponding signals.

3. The method according to claim 1, wherein the extracting of the MFCC parameters according to the separated abnormal sounds comprises converting the separated abnormal sounds into 39-dimensional feature vectors, and the feature vectors have the MFCC parameters including logarithmic energy and delta acceleration factors.

4. The method according to claim 3, wherein the 39-dimensional feature vectors are obtained by training the HMM of the abnormal sound and the HMM of the background noise, and wherein an expectation-maximization (EM) algorithm is configured to train an HMM parameter.

5. The method according to claim 1, wherein a likelihood of the HMM of the background noise is calculated as a probability that feature values of the abnormal sound will be detected in the HMM of the background noise, and a likelihood of the HMM of the abnormal sound is calculated as a probability that feature values of the abnormal sound will be detected in the HMM of the abnormal sound.

6. The method according to claim 1, further comprising, calculating an HMM likelihood of the abnormal sound and an HMM likelihood of the background noise, and determining whether the abnormal sound exists in a particular frame through an HMM likelihood ratio of the background noise to the abnormal sound.

7. The method according to claim 6, further comprising, comparing the HMM likelihood ratio of the background noise to the abnormal sound with a preset reference value, and determining whether the sound signal includes the abnormal sound when the likelihood ratio is larger than the preset reference value.

8. The method according to claim 7, further comprising, setting a probability that each frame will include the abnormal sound to 1 when the likelihood ratio is larger than the preset reference value, setting the probability to 0 otherwise, and determining whether the abnormal sound is included in the sound signal to recognize a dangerous situation when a sum of set probabilities is larger than 0.

* * * * *